(12) United States Patent
Aoyama et al.

(10) Patent No.: US 11,598,661 B2
(45) Date of Patent: Mar. 7, 2023

(54) RESIDUAL GAS VOLUME MEASURING DEVICE, RESIDUAL GAS VOLUME MEASURING METHOD, AND PUNCTURE MEMBER

(71) Applicant: KYOTO ELECTRONICS MANUFACTURING CO., LTD., Kyoto (JP)

(72) Inventors: Kazuhiro Aoyama, Kyoto (JP); Ryoma Naruko, Kyoto (JP); Yutaka Sato, Kanagawa (JP)

(73) Assignee: KYOTO ELECTRONICS MANUFACTURING CO., LTD., Kyoto (JP)

( * ) Notice: Subject to any disclaimer, the term of this patent is extended or adjusted under 35 U.S.C. 154(b) by 242 days.

(21) Appl. No.: 16/972,439

(22) PCT Filed: Jul. 12, 2019

(86) PCT No.: PCT/JP2019/027689
§ 371 (c)(1),
(2) Date: Dec. 4, 2020

(87) PCT Pub. No.: WO2020/026764
PCT Pub. Date: Feb. 6, 2020

(65) Prior Publication Data
US 2021/0172783 A1 Jun. 10, 2021

(30) Foreign Application Priority Data

Jul. 30, 2018 (JP) .............................. JP2018-142549

(51) Int. Cl.
*G01F 17/00* (2006.01)
*G01F 22/02* (2006.01)

(52) U.S. Cl.
CPC .............. *G01F 17/00* (2013.01); *G01F 22/02* (2013.01)

(58) Field of Classification Search
CPC ................................ G01F 17/00; G01F 22/02
(Continued)

(56) References Cited

U.S. PATENT DOCUMENTS 4,096,734 A 6/1978 Khayat
4,791,821 A 12/1988 Spencer
(Continued)

FOREIGN PATENT DOCUMENTS

CN 203758569 8/2014
DE 1051029 B * 2/1959
(Continued)

OTHER PUBLICATIONS

Extended European Search Report for corresponding European Application No. 19843340.1 dated Mar. 16, 2022.
(Continued)

*Primary Examiner* — John Fitzgerald
*Assistant Examiner* — Rodney T Frank
(74) *Attorney, Agent, or Firm* — Renner, Otto, Boisselle & Sklar, LLP

(57) ABSTRACT

A residual gas volume measuring device for measuring volume of residual gas in a container filled with liquid. The device includes: a puncture member having a first communication path and a second communication path formed therein and connecting a penetrating portion and a coupling portion together, the penetrating portion being located inside the container and the coupling portion being located outside the container when the puncture member is in a penetrating position where an end of the puncture member penetrates into the container; an injection section coupled to the first communication path at the coupling portion and configured
(Continued)

to inject a liquid into the container; a discharging section coupled to the second communication path at the coupling portion and configured to discharge the residual gas purged by the injected liquid; and a measurement section configured to measure the volume of the residual gas discharged by the discharging section.

13 Claims, 5 Drawing Sheets

(58) Field of Classification Search
USPC .......................................................... 73/149
See application file for complete search history.

(56) References Cited

U.S. PATENT DOCUMENTS

| 5,060,529 A | 10/1991 | Bals et al. |
| 2010/0236320 A1 | 9/2010 | Stehle et al. |

FOREIGN PATENT DOCUMENTS

| JP | 1062406 A | 3/1998 |
| JP | 10104135 A | 4/1998 |

OTHER PUBLICATIONS

PCT/JP2019/027689; PCT International Search Report and Written Opinion of the International Searching Authority dated Sep. 17, 2019 and its English translation.

* cited by examiner

FIG. 1
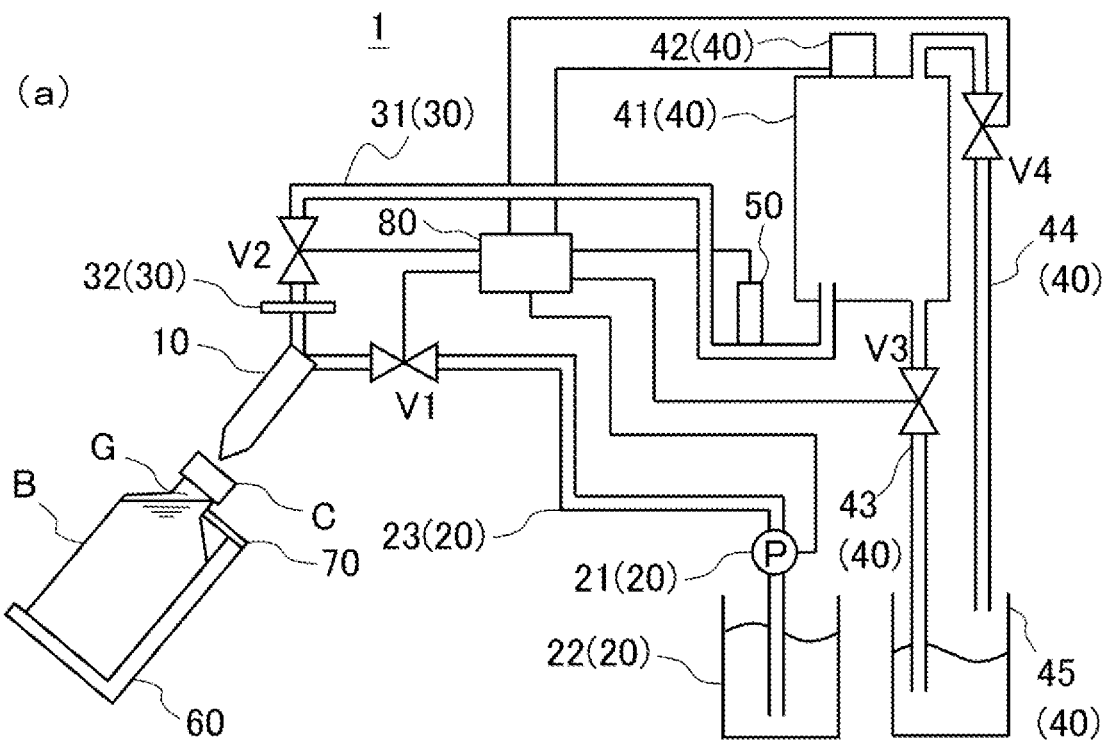
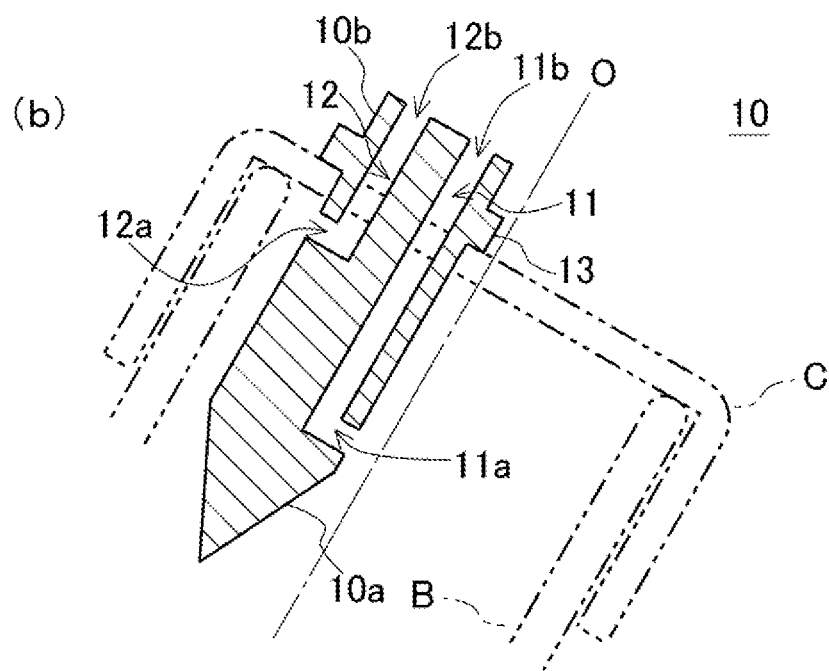

RESIDUAL GAS VOLUME MEASURING DEVICE, RESIDUAL GAS VOLUME MEASURING METHOD, AND PUNCTURE MEMBER

The present application is a U.S. National Stage Application based on and claiming benefit of and priority under 35 U.S.C. § 371 to International Application No. PCT/JP2019/027689, filed 12 Jul. 2019, which in turn claims benefit of and priority to Japanese Application No. 2018-142549, filed 30 Jul. 2018, the entirety of each of which is hereby incorporated herein by reference.

TECHNICAL FIELD

The present invention relates to residual gas volume measuring devices and residual gas volume measuring methods for measuring the volume of residual gas in a container, and puncture members for use in collection of residual gas from a container.

BACKGROUND ART

In the process of bottling soft drinks, alcoholic drinks, etc., the volume of gas remaining in a container (hereinafter referred to as "residual gas") is measured as an item to be managed.

As a classical technique of collecting residual gas from a container for measuring the volume of the gas, a technique (collection-over-water technique) of opening a container with the container immersed in a liquid such as water, and collecting released gas into another container, has conventionally been employed.

As a technique of measuring the volume of residual gas in a container, for example, known is a technique of measuring the volume of a gas other than carbon dioxide gas by collecting residual gas from a container filled with a carbonated drink, and removing carbon dioxide gas from the collected residual gas using a carbon dioxide gas absorbent, such as sodium hydroxide (see, for example, Patent Document 1).

CITATION LIST

Patent Literature

Patent Document 1: Japanese Unexamined Patent Application Publication No. H10-62406

SUMMARY OF INVENTION

Technical Problem

However, the collection-over-water technique requires complicated operations as well as measurement preparation and measurement time, and is easily subject to variations in measured values from operator to operator.

In the technique described in Patent Document 1, residual gas is pushed out and collected from a container which is filled with a carbonated drink under high pressure, by utilizing pressure inside the container. Therefore, the technique described in Patent Document 1 cannot be used to measure the volume of residual gas in a container filled with a non-carbonated liquid, such as a non-carbonated soft drink or a non-carbonated alcoholic drink, because the residual gas cannot be collected from the container.

Thus, no simple technique of collecting residual gas from a container filled with a non-carbonated liquid and measuring the volume of the residual gas has been known.

With the above problems in mind, the present invention has been made. It is an object of the present invention to provide a residual gas volume measuring device and residual gas volume measuring method capable of easily measuring the volume of residual gas in a container filled with a non-carbonated liquid, and a puncture member that can be used in collection of residual gas from a container filled with a liquid.

Solution to Problem

To achieve the above object, a characteristic feature of a residual gas volume measuring device according to the present invention is a residual gas volume measuring device for measuring the volume of residual gas in a container, comprising:

a puncture member having a first and a second communication path formed therein and connecting a penetrating portion and a coupling portion thereof together, the penetrating portion being located inside the container and the coupling portion being located outside the container when the puncture member is in a penetrating position where an end of the puncture member penetrates into the container;

an injection section coupled to the first communication path at the coupling portion and configured to inject a liquid into the container;

a discharging section coupled to the second communication path at the coupling portion and configured to discharge the residual gas purged by the injected liquid; and a measurement section configured to measure the volume of the residual gas discharged by the discharging section.

In the residual gas volume measuring device having this feature, once the puncture member has penetrated into the container, a liquid can be injected into the container through the first communication path, and the residual gas can be collected from the container through the second communication path. Therefore, the volume of residual gas in a container filled with a liquid can be easily measured.

In the residual gas volume measuring device of the present invention, the first and second communication paths each preferably have an opening at the respective penetrating portion, the opening at the penetrating portion of the first communication path being preferably located deeper in the container than is the opening at the penetrating portion of the second communication path when the puncture member is in the penetrating position.

In the residual gas volume measuring device having this feature, the opening at the penetrating portion of the first communication path is located deeper in the container than is the opening at the penetrating portion of the second communication path when the puncture member is in the penetrating position. Therefore, even after the level of the liquid is raised above the opening at the penetrating portion of the first communication path in the container due to the injection of the liquid, the residual gas can be collected from the container until the level of the liquid reaches the opening of the second communication path. As a result, the occurrence of a space in the container from which the residual gas cannot be collected can be prevented, resulting in measurement of the volume of the residual gas with higher accuracy.

In the residual gas volume measuring device of the present invention, the first and second communication paths each preferably have an opening at the respective penetrating portion, the openings being oriented in opposite directions.

In the residual gas volume measuring device having this feature, a space from which the residual gas cannot be collected can be prevented from occurring in the container when the container is tilted, resulting in an improvement in measurement accuracy. In addition, the liquid injected through the first communication path can be prevented from directly flowing into the second communication path.

The residual gas volume measuring device of the present invention preferably further comprises:

a container holding section configured to tilt the container so that the opening at the penetrating portion of the second communication path faces upward, with the puncture member penetrating into the container.

In the residual gas volume measuring device having this feature, the container is tilted with the opening at the penetrating portion of the second communication path facing upward, and therefore, the gas remaining in the container when the level of the liquid reaches the opening of the second communication path in the container can be reduced. As a result, the volume of residual gas can be measured with higher accuracy.

The residual gas volume measuring device of the present invention preferably further comprises:

a position adjustment section configured to adjust a position on a cap member of the container where the puncture member penetrates so that the position is located above a center of the cap member with the container tilted.

In the residual gas volume measuring device having this feature, the position where the puncture member penetrates is adjusted to be above the center of the cap member with the container tilted. Therefore, the gas remaining in the container when the level of the liquid reaches the opening of the second communication path in the container can be further reduced.

The residual gas volume measuring device of the present invention preferably further comprises:

a detection section configured to detect the end of discharging of the residual gas from the container.

In the residual gas volume measuring device having this feature, the detection of the end of discharging of the residual gas from the container can prevent injection of an extra liquid by the injection section, so that the volume of the residual gas can be measured more quickly.

To achieve the above object, a characteristic feature of a residual gas volume measuring method according to the present invention is a residual gas volume measuring method for measuring the volume of residual gas in a container, comprising:

a penetration step of causing a puncture member having a first and a second communication path formed therein and connecting a first and a second end portion thereof together, to penetrate a cap member of the container, so that the puncture member is in a penetrating position where the first end portion of the puncture member penetrates into the container, and the second end portion of the puncture member is located outside the container;

an injection step of injecting a liquid into the container through the first communication path;

a collection step of collecting the residual gas in the container purged by the injected liquid, through the second communication path; and a measurement step of measuring the volume of the collected residual gas.

In the residual gas volume measuring method having this feature, the puncture member having the first and second communication path formed therein and connecting the first and second end portions together is used, and therefore, once the puncture member has penetrated into the container, a liquid can be injected into the container through the puncture member, and the residual gas can be collected from the container. Therefore, the volume of residual gas in a container filled with a liquid can be easily measured.

In the residual gas volume measuring method of the present invention, before the penetration step, a preparation step of filling the first and second communication paths with a liquid is preferably performed.

In the residual gas volume measuring method having this feature, before the penetration step, the first and second communication paths are filled with a liquid, and therefore, a gas can be prevented from entering the container during puncture by the puncture member. As a result, the volume of residual gas can be measured with higher accuracy.

To achieve the above object, a characteristic feature of a puncture member according to the present invention is a puncture member for use in collection of residual gas in a container, comprising:

a first and a second communication path formed therein and connecting a penetrating portion and a coupling portion thereof together, the penetrating portion being located inside the container and the coupling portion being located outside the container when the puncture member is in a penetrating position where an end of the puncture member penetrates into the container, wherein the first and second communication paths each have an opening at the respective penetrating portion, the opening at the penetrating portion of the first communication path being located deeper in the container than is the opening at the penetrating portion of the second communication path when the puncture member is in the penetrating position.

In the puncture member having this feature, once the puncture member has penetrated into the container, a liquid can be injected into the container through the first communication path, and the residual gas can be collected from the container through the second communication path. In addition, the opening at the penetrating portion of the first communication path is located deeper in the container than is the opening at the penetrating portion of the second communication path when the puncture member is in the penetrating position. Therefore, even after the level of the liquid is raised above the opening at the penetrating portion of the first communication path in the container due to the injection of a liquid through the first communication path, the residual gas can be collected from the container until the level of the liquid reaches the opening of the second communication path. As a result, a space from which the residual gas cannot be collected can be inhibited from occurring in the container.

BRIEF DESCRIPTION OF DRAWINGS

FIG. 1 is a diagram for describing a residual gas volume measuring device 1 according to the present invention.

DESCRIPTION OF EMBODIMENTS

Figure 2:
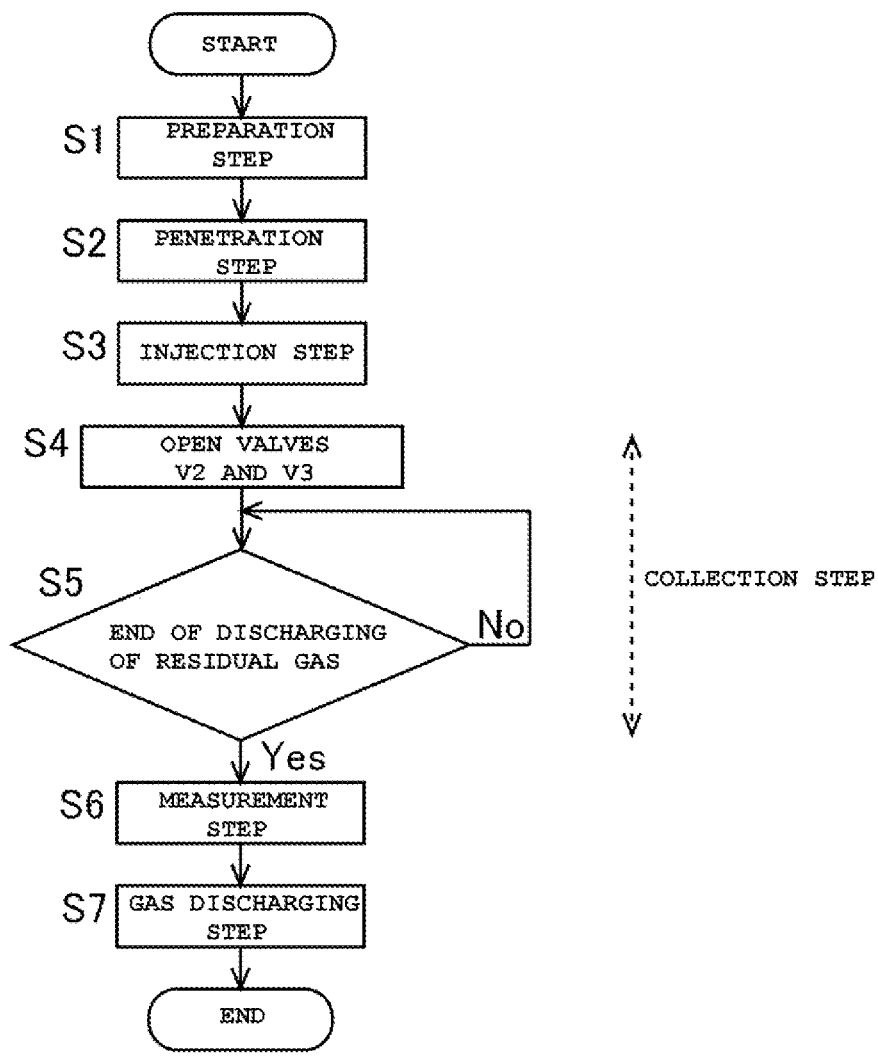
FIG. 2 is a flowchart of a residual gas volume measuring method according to the present invention.

A residual gas volume measuring device, residual gas volume measuring method, and puncture member according to the present invention will now be described. Note that the present invention is in no way intended to be limited to configurations described in the following embodiments and the accompanying drawings.

<Residual Gas Volume Measuring Device>

FIG. 1 is a diagram for describing a residual gas volume measuring device 1 according to the present invention. FIG. 1(a) is a diagram showing a configuration of the residual gas volume measuring device 1. The residual gas volume measuring device 1 is used to inspect a container B which is filled with a non-carbonated liquid, such as a soft drink, and is sealed by a cap member C, particularly to measure the volume of residual gas G remaining in the container B. In the measurement of the volume of the residual gas G using the residual gas volume measuring device 1, a liquid is used for collection of the residual gas G like the collection-over-water technique. Preferably, the liquid for collection of the residual gas G is an easily available liquid, such as water, alcohol, or oil. In the description that follows, water is used as an example of the liquid for collection of the residual gas G. The residual gas volume measuring device 1 comprises a puncture member 10, an injection section 20, a discharging section 30, and a measurement section 40, and optionally, a detection section 50, a container holding section 60, and a position adjustment section 70. The operation of the residual gas volume measuring device 1 is entirely controlled by a control section 80 which is a computer having a CPU, a memory, a storage, etc., and which particularly controls the opening and closing of valves, and the driving and stopping of a pump.

The puncture member 10 is a hollow needle made of a metal material, such as stainless steel, and including two communication paths formed therein. In a measurement operation of the residual gas volume measuring device 1, the cap member C is punctured by the puncture member 10 being driven by a drive unit (not shown), leaving an end portion (needle tip) thereof penetrating into the container B (hereinafter referred to as a "penetrating position"). In the measurement operation, the two communication paths formed in the puncture member 10 are preferably previously filled with water before puncture by the puncture member 10 in order to prevent a gas from entering the container B during puncture by the puncture member 10. FIG. 1(b) is a cross-sectional view of the puncture member 10. In the puncture member 10, a first communication path 11 and a second communication path 12 are formed. The first communication path 11 connects an opening 11a at a penetrating portion 10a penetrating into the container B in the penetrating position to an opening 11b at a coupling portion 10b protruding out of the container B in the penetrating position. The second communication path 12 connects an opening 12a at the penetrating portion 10a located in the container B in the penetrating position to an opening 12b at the coupling portion 10b. The opening 11a at the penetrating portion 10a of the first communication path 11 and the opening 12a at the penetrating portion 10a of the second communication path 12 are preferably oriented in opposite directions. If the opening 11a and the opening 12a are oriented in opposite directions, as shown in FIG. 1(b) the opening 12a of the second communication path 12 is held, facing upward, when the container B is tilted during an operation of measuring residual gas as described below. In addition, the opening 11a of the first communication path 11 is preferably located deeper in the container B than is the opening 12a of the second communication path 12 when the puncture member 10 is in the penetrating position. In this case, the opening 12a of the second communication path 12 is preferably located close to the lower surface of the top plate of the cap member C when the puncture member 10 is in the penetrating position. The location of the opening 12a close to the lower surface of the top plate of the cap member C inhibits the occurrence of a space in the container B from which the residual gas G cannot be collected, resulting in a more accurate measurement of the volume of the residual gas G. The distance between an upper end of the opening 12a and the lower surface of the top plate of the cap member C is preferably 1.5 mm or less. If the distance between the upper end of the opening 12a and the lower surface of the top plate of the cap member C exceeds 1.5 mm, the volume of the residual gas G may not be measured with sufficient accuracy. The puncture member 10 may be provided with a collar 13. By setting the distance between the collar 13 and the upper end of the opening 12a to about the thickness of the top plate of the cap member C, the distance between the opening 12a and the lower surface of the top plate of the cap member C can be appropriately adjusted when the puncture member 10 is in the penetrating position. Alternatively, instead of providing the collar 13, the distance between the opening 12a and the lower surface of the top plate of the cap member C can be appropriately set by adjusting the stroke of the puncture operation by the drive unit.

The injection section 20 comprises a pump 21, a water supply tank 22, and an injection tube 23. The injection tube is provided with a valve V1. The injection tube 23 is coupled to the first communication path 11 at the opening 11b of the puncture member 10. The control section 80 controls the pump 21 and the valve V1 so that the injection section 20 injects water retained in the water supply tank 22 into the container B through the first communication path 11.

One end of the discharging section 30 is coupled to the second communication path 12 at the opening 12b of the puncture member 10. The discharging section 30 has, at the other end, a discharging tube 31 coupled to the measurement section 40. The discharging tube 31 is provided with a valve V2. In a measurement operation of the residual gas volume measuring device 1, the control section 80 controls and opens the valve V2 so that the residual gas G purged by water injected into the container B by the injection section 20 is introduced into the measurement section 40 by the discharging section 30. The discharging section 30 preferably has a filter 32 such as a net filter upstream of the valve V2.

The measurement section 40 comprises a collection tank into which the residual gas G is introduced, a measuring device 42 which measures the volume of the residual gas G collected into the collection tank 41, a discharged water tube which is extended from a lower end portion of the collection tank 41 and is in communication with a discharged water tank 45, a discharged gas tube 44 which is extended from an upper end portion of the collection tank 41 and is in communication with the discharged water tank 45, and the discharged water tank 45. The discharged water tube 43 and the discharged gas tube 44 are provided with a valve V3 and a valve V4, respectively. The measuring device 42, which has a pressure sensor (not shown), measures a gas pressure of a gas layer in the collection tank 41 at an upper end portion of the collection tank 41, and calculates the volume of the residual gas G from the measured gas pressure by computation. Note that the method for measuring the volume of the gas layer in the collection tank 41 is not limited to computation from the pressure, and may be any other suitable method. For example, a light source and a light measuring unit may be provided as the measuring device 42, and the volume of the gas layer in the collection tank 41 may be optically measured.

The detection section 50, which has a light source and a light measuring unit on opposite sides of the discharging tube 31, detects whether a gas or a liquid is passing through the discharging tube 31, based on the intensity of light passing through the discharging tube 31. When the passage of a gas is replaced by the passage of a liquid, the intensity of light passing through the discharging tube 31 decreases, and the detection section 50 transmits, to the control section 80, a decrease signal indicating that the discharging of the residual gas G from the container B has ended.

The container holding section 60 is a holder for holding the container B in a tilted position. When the container B is tilted, as shown in FIG. 1(b) the puncture member 10 is held with the opening 12a of the second communication path 12 facing upward. A gap between the opening 12a of the second communication path 12 and the lower surface of the top plate of the cap member C may be relatively large, which depends on how much the puncture member 10 penetrates. When the container B is tilted, the volume of a space formed by the gap between the opening 12a and the lower surface of the top plate of the cap member C, from which the residual gas G cannot be collected, can be reduced compared to when the container B is in an upright position, and therefore, the volume of the residual gas G can be measured with higher accuracy. The angle by which the container holding section 60 tilts the container B is preferably 20-50° with respect to the vertical direction. If the tilt angle of the container B is less than 20°, the volume of the space formed by the gap between the opening 12a and the lower surface of the top plate of the cap member C, from which the residual gas G cannot be collected, may not sufficiently be reduced. If the tilt angle of the container B is more than 50°, the residual gas G is retained by a portion of the container B other than the opening, which depends on the shape of the container B, and therefore, cannot be collected through the puncture member 10. Note that the container holding section 60 may be configured to tilt the holder using a motor after causing the puncture member 10 to penetrate through the cap member C with the container B held in an upright position.

The position adjustment section 70 is a guide member for adjusting a position where the puncture member 10 penetrates the cap member C. As shown in FIG. 1(b), the position adjustment section 70 guides the container B and/or the puncture member 10 so that the penetrating puncture member 10 is located above a center O of the cap member C with the container B tilted. Even when the puncture member 10 penetrates to a greater extent, so that the gap between the opening 12a of the second communication path 12 and the lower surface of the top plate of the cap member C is relatively large, the volume of the space formed by the gap between the opening 12a and the lower surface of the top plate of the cap member C, from which the residual gas G cannot be collected, can be reduced if the penetrating puncture member 10 is located above the center O of the cap member C, resulting in an improvement in the measurement accuracy of the volume of the residual gas G. The position adjustment section 70 may be configured to be replaced by a suitable guide member, depending on the shapes of the container B and the cap member C.

The control section 80 may be a computer having a CPU, a memory, a storage, etc., in which the CPU reads and executes a program stored in the memory to control each constituent element.

<Residual Gas Volume Measuring Method>

A residual gas volume measuring method that is executed in the residual gas volume measuring device 1 will be described. FIG. 2 is a flowchart of a residual gas volume measuring method according to the present invention. The residual gas volume measuring method comprises a preparation step (S1), a penetration step (S2), an injection step (S3), a collection step (S4 and S5), a measurement step (S6), and a gas discharging step (S7), which are sequentially executed. Note that the preparation step (S1) before the penetration step (S2), and the gas discharging step (S7) after the measurement step (S6), are optionally executed.

In the preparation step (S1), in order to fill the first communication path 11 and the second communication path 12 of the puncture member 10 with water, the puncture member 10 is immersed in a preparation container (not shown) filled with water, and the valves V1, V2, and V4 are opened, and the pump 21 is driven, with the opening 11a and the opening 12a located underwater. After, by the driving of the pump 21, the first communication path 11, the second communication path 12, the injection tube 23, the discharging tube 31, and the collection tank 41 are filled with water, the valves V1, V2, and V4 are closed, and the pump 21 is stopped. Thus, by the execution of the preparation step (S1), a gas can be prevented from entering the container B when puncture is performed using the puncture member 10 in the next step, i.e., the penetration step (S2). As a result, the volume of residual gas can be measured with higher accuracy.

Figure 3:
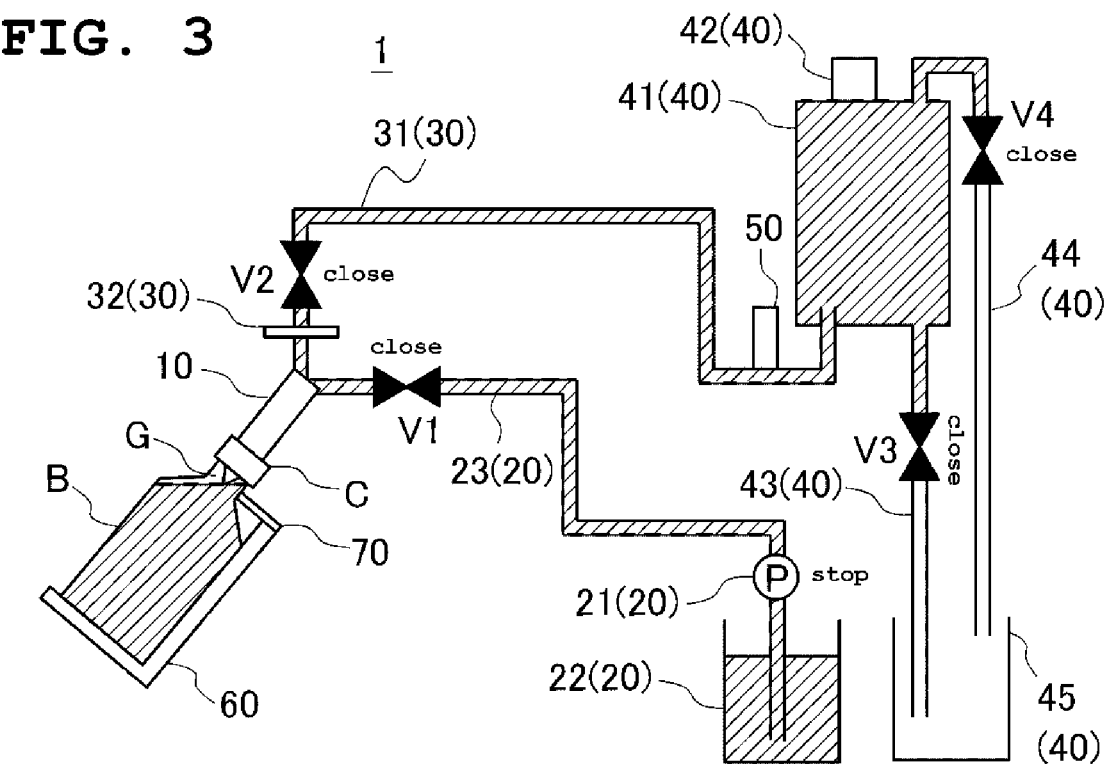
FIG. 3 is a diagram for describing a penetration step.

FIG. 3 is a diagram for describing the penetration step (S2). In the penetration step (S2), the puncture member 10 is caused by an action of the drive unit to penetrate the cap member C of the container B with the first communication path 11, the second communication path 12, the injection tube 23, the discharging tube 31, and the collection tank 41 filled with water, and the valves V1-V4 closed. Thus, the puncture member 10 is in a penetrating position with a tip end thereof located in the container B. The position of the puncture by the puncture member 10 is adjusted to be above the center O of the cap member C with the container B tilted as shown in FIG. 1(b). Note that in the penetration step (S2), after the container B may be tilted and set on a holder for holding the container B, the puncture member 10 may be caused to penetrate the cap member C with the container B tilted. Alternatively, after the container B may be set on the holder in an upright position, the puncture member 10 may be caused to penetrate the cap member C with the container B in the upright position, and thereafter, the holder holding the container B may be tilted.

Figure 4:
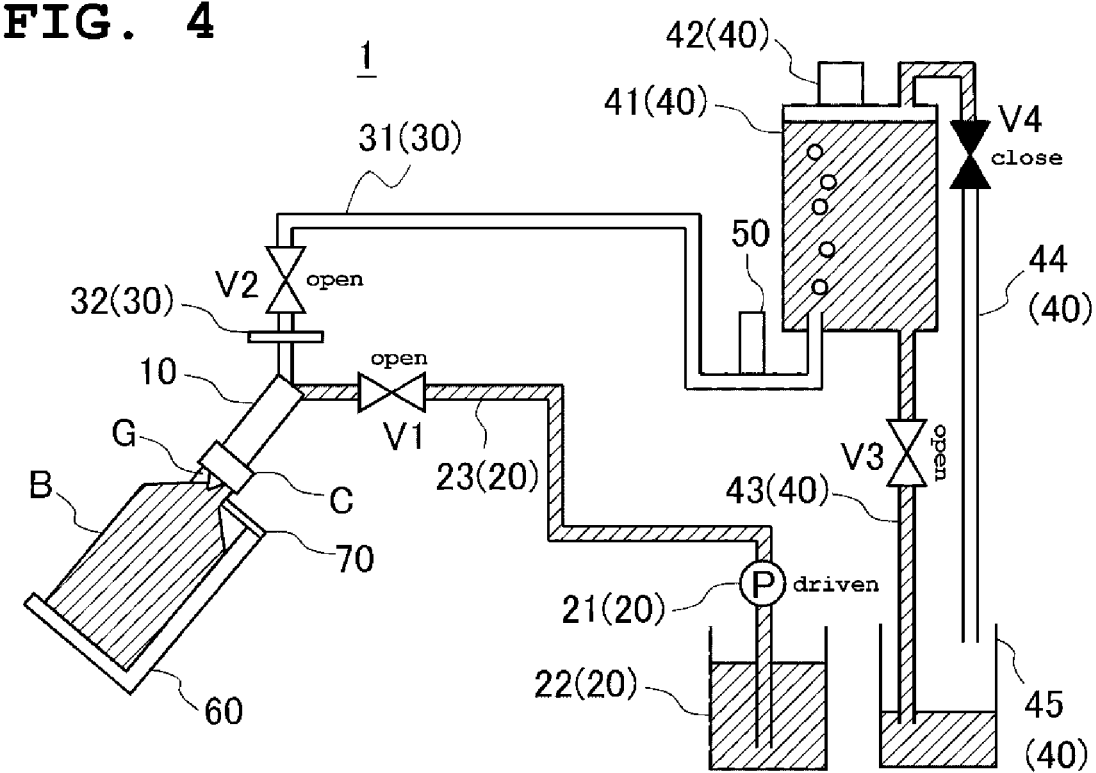
FIG. 4 is a diagram for describing an injection step and a collection step.

FIG. 4 is a diagram for describing the injection step (S3) and the collection step (S4 and S5). In the injection step (S3), the valve V1 is opened, and the pump 21 is driven. As a result, water is injected from the water supply tank 22 into the container B through the injection tube 23 and then the first communication path 11 of the puncture member 10, so that the water level of the container B is raised. In the collection step, the valves V2 and V3 are opened (S4), so that the residual gas G purged by water injected into the container B is discharged through the second communication path 12 of the puncture member 10, and is introduced into the collection tank 41 through the discharging tube 31. The residual gas G introduced into the collection tank 41 is accumulated as a gas layer in an upper end portion of the collection tank 41. In the collection step, furthermore, a passage state of the discharging tube 31 is monitored by the detection section 50 (S5), and when the passage of a gas is replaced by the passage of a liquid, so that the intensity of light passing through the discharging tube 31 decreases, i.e., the detection section 50 detects the end of discharging of the residual gas G from the container B (S5: YES), the detection section 50 transmits a decrease signal indicating the detection result to the control section 80.

Figure 5:
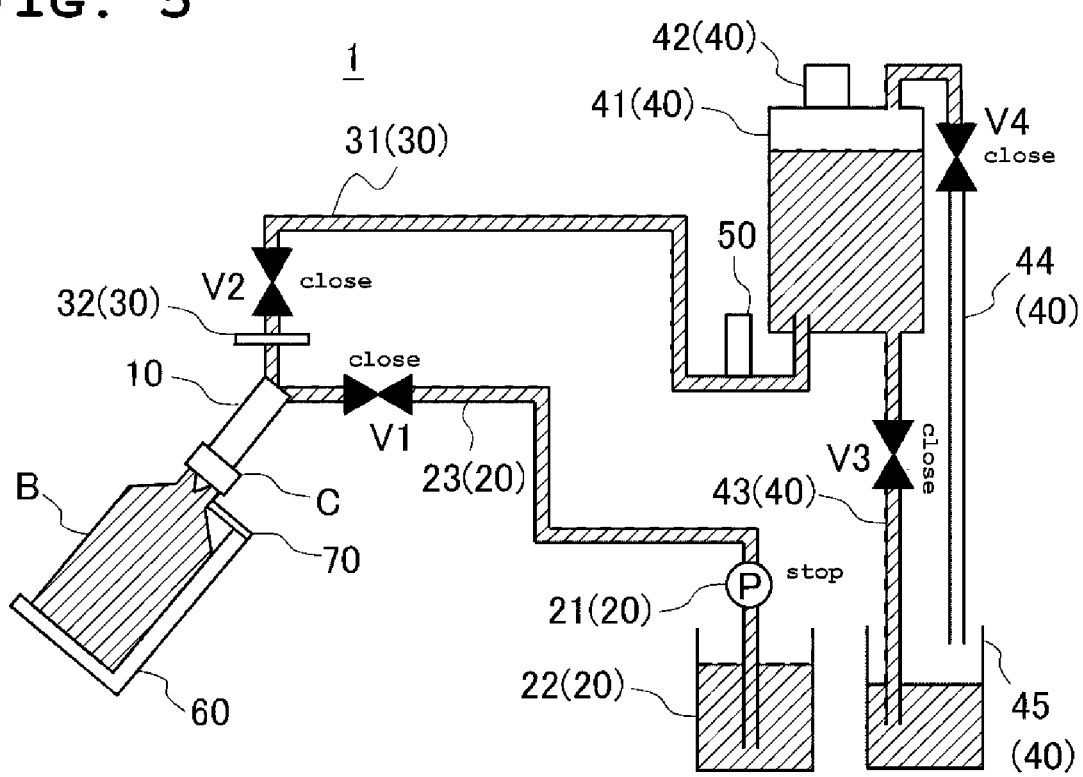
FIG. 5 is a diagram for describing a measurement step.

FIG. 5 is a diagram for describing the measurement step (S6). The measurement step (S6) is performed after the control section 80 receives the decrease signal indicating the end of discharging of the residual gas G from the container B. In the measurement step (S6), the valves V1-V3 are closed, and the pump 21 is stopped, and in this state, the measuring device 42 is used to measure the volume of the residual gas G accumulated as a gas layer in the collection tank 41. The value of the measured volume is recorded in a memory of the residual gas volume measuring device 1, or is displayed on a display device, such as a monitor.

Figure 6:
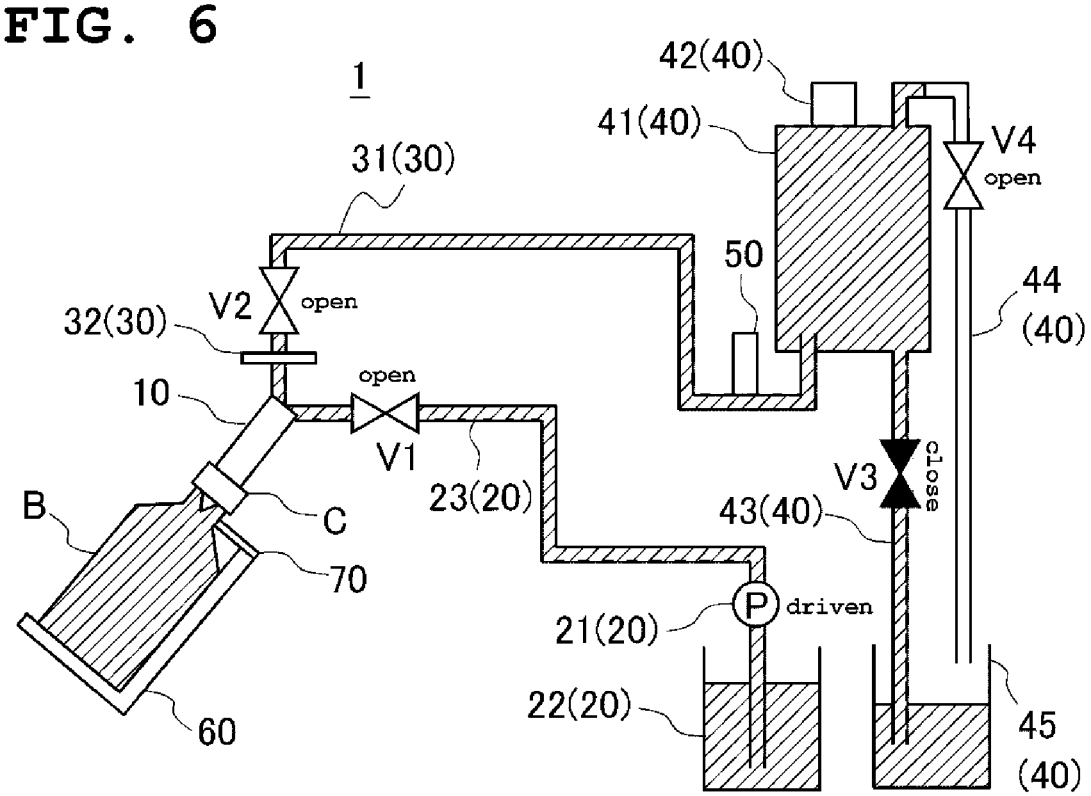
FIG. 6 is a diagram for describing a gas discharging step.

FIG. 6 is a diagram for describing the gas discharging step (S7). In the gas discharging step (S7), the valves V1, V2, and V4 are opened, and the pump 21 is driven. As a result, the residual gas G accumulated in an upper end portion of the collection tank 41 is discharged out through the discharged gas tube 44. During the discharging, the measuring device 42 monitors a state of the gas layer in the collection tank 41. When the measuring device 42 detects the discharging of all the gas from the collection tank 41, the valves V1, V2, and V4 are closed, and the pump 21 is stopped.

By the above procedure, the residual gas volume measuring method is completed. Note that after the execution of the gas discharging step (S7), the residual gas volume measuring device 1 is in the same state as that after the execution of the preparation step (S1), i.e., the first communication path 11, the second communication path 12, the injection tube 23, the discharging tube 31, and the collection tank 41 are filled with water, and the valves V1-V4 are closed. Therefore, in the case where a plurality of containers are to be inspected and successively subjected to the residual gas volume measuring method, the preparation step (S1) may be executed only in the first measurement, and may not be performed in the following measurements.

EXAMPLES

Next, the results of measurements of the volumes of residual gas in PET bottles using a residual gas volume measuring device according to the present invention will be described.

Five PET bottles having a capacity of 500 mL were each prepared, filled with water, and sealed by a cap member. The volume of air remaining in each PET bottle was previously adjusted to 15.03 mL. The volume of residual gas in each PET bottle was measured using a residual gas volume measuring device according to the present invention. The measurement results are shown in Table 1.

TABLE 1

|  | Measured value (mL) |
| --- | --- |
| 1 | 15.20 |
| 2 | 15.20 |

TABLE 1-continued

|  | Measured value (mL) |
| --- | --- |
| 3 | 15.20 |
| 4 | 14.90 |
| 5 | 15.20 |
| Average value | 15.14 |
| Standard deviation | 0.13 |

The measurement results show that the average value of the measured values of residual gas in the five PET bottles was 15.14 mL, and the difference from the true value was as small as 0.11 mL. In addition, the standard deviation of the measure values of residual gas in the five PET bottles was 0.13, which indicates that measurement variations were sufficiently small. Thus, it was demonstrated that the residual gas volume measuring device of the present invention can measure the volume of residual gas in a PET bottle with higher accuracy.

INDUSTRIAL APPLICABILITY

The residual gas volume measuring device of the present invention can be used in an application in which the volume of residual gas in a container, such as a PET bottle, which is filled with a non-carbonated liquid is measured.

REFERENCE SIGNS LIST

1 RESIDUAL GAS VOLUME MEASURING DEVICE
10 PUNCTURE MEMBER
10a PENETRATING PORTION
10b COUPLING PORTION
11 FIRST COMMUNICATION PATH
12 SECOND COMMUNICATION PATH
20 INJECTION SECTION
30 DISCHARGING SECTION
40 MEASUREMENT SECTION
50 DETECTION SECTION
60 CONTAINER HOLDING SECTION
70 POSITION ADJUSTMENT SECTION
B CONTAINER
C CAP MEMBER
G RESIDUAL GAS

The invention claimed is:
1. A residual gas volume measuring device for measuring the volume of residual gas in a container, comprising:
a puncture member having a first and a second communication path formed therein and connecting a penetrating portion and a coupling portion thereof together, the penetrating portion being located inside the container and the coupling portion being located outside the container when the puncture member is in a penetrating position when an end of the puncture member penetrates into the container, wherein the puncture member comprises a hollow needle and both the first communication path and the second communication path are formed within the hollow needle;
an injection section coupled to the first communication path at the coupling portion and configured to inject a liquid into the container;
a discharging section coupled to the second communication path at the coupling portion and configured to discharge the residual gas purged by the liquid injected by the injection section; and a measurement section configured to measure the volume of the residual gas discharged by the discharging section.

2. The residual gas volume measuring device of claim 1, wherein
the first and second communication paths each have an opening at the respective penetrating portion, the opening at the penetrating portion of the first communication path being located deeper in the container than is the opening at the penetrating portion of the second communication path when the puncture member is in the penetrating position.

3. The residual gas volume measuring device of claim 2, wherein
the first and second communication paths each have an opening at the respective penetrating portion, the openings being oriented in opposite directions.

4. The residual gas volume measuring device of claim 3, further comprising:
a container holding section configured to tilt the container so that the opening at the penetrating portion of the second communication path faces upward, with the puncture member penetrating into the container.

5. The residual gas volume measuring device of claim 4, further comprising:
a position adjustment section configured to adjust a position on a cap member of the container where the puncture member penetrates so that the position is located above a center of the cap member with the container tilted.

6. The residual gas volume measuring device of claim 2, further comprising:
a detection section configured to detect the end of discharging of the residual gas from the container.

7. The residual gas volume measuring device of claim 1, wherein
the first and second communication paths each have an opening at the respective penetrating portion, the openings being oriented in opposite directions.

8. The residual gas volume measuring device of claim 7, further comprising:
a container holding section configured to tilt the container so that the opening at the penetrating portion of the second communication path faces upward, with the puncture member penetrating into the container.

9. The residual gas volume measuring device of claim 8, further comprising:
a position adjustment section configured to adjust a position on a cap member of the container where the puncture member penetrates so that the position is located above a center of the cap member with the container tilted.

10. The residual gas volume measuring device of claim 1, further comprising:
a detection section configured to detect the end of discharging of the residual gas from the container.

11. A residual gas volume measuring method for measuring the volume of residual gas in a container filled with a non-carbonated liquid, comprising:
a penetration step of causing a puncture member to penetrate a cap member of the container, the puncture member having a first and a second communication path formed therein and connecting a penetrating portion and a coupling portion thereof together, so that the penetrating portion is located inside the container and the coupling portion is located outside the container when the puncture member is in a penetrating position, wherein the puncture member comprises a hollow needle and both the first communication path and the second communication path are formed within the hollow needle;
an injection step of injecting a liquid into the container through the first communication path;
a collection step of collecting the residual gas in the container purged by the injected liquid, through the second communication path; and
a measurement step of measuring the volume of the collected residual gas.

12. The residual gas volume measuring method of claim 11, comprising, before the penetration step:
a preparation step of filling the first and second communication paths with a liquid.

13. A puncture member for use in collection of residual gas in a container, comprising:
a first and a second communication path formed therein and connecting a penetrating portion and a coupling portion thereof together, the penetrating portion being located inside the container and the coupling portion being located outside the container when the puncture member is in a penetrating position where an end of the puncture member penetrates into the container,
wherein
the first and second communication paths each have an opening at the respective penetrating portion, the opening at the penetrating portion of the first communication path being located deeper in the container than is the opening at the penetrating portion of the second communication path when the puncture member is in the penetrating position, and a liquid can be injected into the container through the first communication path, wherein the puncture member comprises a hollow needle and both the first communication path and the second communication path are formed within the hollow needle.

* * * * *